United States Patent
Jia et al.

(10) Patent No.: US 8,538,416 B2
(45) Date of Patent: Sep. 17, 2013

(54) REMOTE INITIATION OF COLLECTING DIAGNOSTIC INFORMATION FOR NETWORK COMMUNICATIONS

(75) Inventors: Yongli Jia, Shenzhen (CN); Xingwu Chen, Shenzhen (CN); Lin Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 204 days.

(21) Appl. No.: 12/979,129

(22) Filed: Dec. 27, 2010

(65) Prior Publication Data

US 2011/0143747 A1    Jun. 16, 2011

Related U.S. Application Data

(63) Continuation of application No. PCT/CN2009/072470, filed on Jun. 26, 2009.

(30) Foreign Application Priority Data

Jun. 27, 2008    (CN) .......................... 2008 1 0127542

(51) Int. Cl.
*H04W 24/00*    (2009.01)

(52) U.S. Cl.
USPC .................. 455/423; 455/67.13; 379/26.01; 379/221.03; 379/9

(58) Field of Classification Search
USPC ............ 455/67.13, 67.14, 67.7, 410, 411, 455/423–425, 415; 379/32.01, 26.01, 221.06, 379/1.03, 27.07, 9
See application file for complete search history.

(56) References Cited

U.S. PATENT DOCUMENTS

| | | | | |
|---|---|---|---|---|
| 5,524,139 A | * | 6/1996 | Jones | 379/88.25 |
| 5,933,475 A | * | 8/1999 | Coleman | 379/10.01 |
| 5,940,473 A | * | 8/1999 | Lee | 379/10.01 |
| 6,195,415 B1 | * | 2/2001 | Shimoda et al. | 379/22 |
| 6,301,355 B1 | * | 10/2001 | Sui | 379/386 |
| 8,265,660 B1 | * | 9/2012 | Vargantwar et al. | 455/458 |
| 2001/0002903 A1 | * | 6/2001 | Chung | 370/286 |

(Continued)

FOREIGN PATENT DOCUMENTS

| | | |
|---|---|---|
| CN | 1491019 A | 4/2004 |
| CN | 1713665 A | 12/2005 |
| CN | 1905601 A | 1/2007 |
| CN | 101316430 A | 3/2008 |

OTHER PUBLICATIONS

1st Office Action in corresponding Chinese Application No. 200810127542.X (Sep. 13, 2010).

(Continued)

*Primary Examiner* — Sujatha Sharma
(74) *Attorney, Agent, or Firm* — Leydig, Voit & Mayer, Ltd.

(57) ABSTRACT

A method for collecting communication information, a test method and a network device are disclosed. The method for collecting communication information includes: presetting a command for collecting diagnostic information about voice quality, and obtaining Dual Tone Multi Frequency (DTMF) signals; and judging whether the DTMF signals match a preset command for collecting diagnostic information about voice quality, and collecting information according to the preset command if determining that the DTMF signals match the preset command. A test method is also provided, and, accordingly, a network device is provided. Through the technical solution under the present invention, diagnostic information is collected quickly after a voice quality problem occurs.

9 Claims, 3 Drawing Sheets

(56) References Cited

U.S. PATENT DOCUMENTS

| | | | |
|---|---|---|---|
| 2006/0008069 A1* | 1/2006 | Deo et al. | 379/221.06 |
| 2006/0073786 A1 | 4/2006 | Sarkar | |
| 2006/0105763 A1* | 5/2006 | Lipsit | 455/423 |
| 2008/0181368 A1* | 7/2008 | O'Sullivan et al. | 379/1.01 |
| 2009/0106406 A1* | 4/2009 | Bernard et al. | 709/223 |
| 2009/0116622 A1* | 5/2009 | Campbell et al. | 379/1.03 |
| 2009/0132487 A1* | 5/2009 | Lev | 707/3 |
| 2010/0223614 A1* | 9/2010 | Bhayani et al. | 718/1 |

OTHER PUBLICATIONS

"TS 100 532—Digital cellular telecommunications system (Phase 2+); Support of Dual Tone Multi-Frequency signalling (DTMF) via the GSM system (GSM 03.14 version 6.0.0 Release 1997)," Mar. 1993, Version 6.0.0, ETSI, Valbonne, France.

"3GPP TS 23.014—3rd Generation Partnership Project; Technical Specification Group Core Network; Support of Dual Tone Multi-Frequency (DTMF) signalling (Release 6)," Jan. 2005, Version 6.0.0, $3^{rd}$ Generation Partnership Project, Valbonne, France.

"Q.764—Signalling system No. 7—ISDN user part signalling procedures," Series Q: Switching and Signalling Specifications of Signalling System No. 7—ISDN user part, Dec. 1999, International Telecommunication Union, Geneva, Switzerland.

State Intellectual Property Office of The People'S Republic of China, International Search Report in International Patent Application No. PCT/CN2009/072470 (Sep. 17, 2009).

Written Opinion of the International Searching Authority in corresponding PCT Application No. PCT/CN2009/072470 (Sep. 17, 2009).

Rejection Decision in corresponding Chinese Application No. 200810127542.X (Jul. 6, 2011).

Extended European Search Report in corresponding European Application No. 09768803.0 (Sep. 16, 2011).

Notice of Reexamination in corresponding Chinese Patent Application No. 200810127542.X (May 2, 2013).

* cited by examiner

REMOTE INITIATION OF COLLECTING DIAGNOSTIC INFORMATION FOR NETWORK COMMUNICATIONS

CROSS-REFERENCE TO RELATED APPLICATIONS

This application is a continuation of International Application No. PCT/CN2009/072470, filed on Jun. 26, 2009, which claims priority to Chinese Patent Application No. 200810127542.X, filed on Jun. 27, 2008, both of which are hereby incorporated by reference in their entireties.

FIELD OF THE INVENTION

The present invention relates to communications technologies, and in particular, to a method for collecting communication information, a test method, and a network device.

BACKGROUND OF THE INVENTION

In a mobile communication system, due to the transmission quality problem of a radio interface, hardware fault of switching equipment, or exception of timeslot switching control of a Base Station Controller (BSC) or a Mobile Switching Center (MSC) in special scenarios, voice quality problems may occur occasionally in the communication process. The voice quality problems include: one-way audio, no audio, crosstalk, and noise.

When a voice quality problem occurs, a user generally lodges a complaint to the telecom operator. The telecom operator analyzes the complaint and determines the scope of abnormal calls. The telecom manufacturer lets the problem recur through dialing tests, collects diagnostic information about abnormal calls, and analyzes and solves the problem according to the collected information.

In existing systems, a dialing test is performed to let the problem recur and diagnostic information about abnormal calls is collected in the following way: When a voice quality problem recurs to a call during a dialing test, the call is held, and then a technical support engineer sends test and maintenance commands to a Network Element (NE) through an Operation & Maintenance Center (OMC) to collect diagnostic information. The maintenance takes a long time.

Existing systems have at least the following problems.

In existing systems, the technical support engineer needs to send test and maintenance commands to the NE through an OMC to collect diagnostic information, which takes a long time and makes it difficult to collect diagnostic information quickly after a voice quality problem occurs occasionally.

SUMMARY OF THE INVENTION

Embodiments of the present invention provide a method for collecting communication information, a test method, and a network device so that diagnostic information can be collected quickly after a voice quality problem occurs.

The embodiments of the present invention are implemented by the following technical solutions:

A method for collecting communication information in an embodiment of the present invention includes: presetting a command for collecting diagnostic information about voice quality, and obtaining Dual Tone Multi Frequency (DTMF) signals; and judging whether the DTMF signals match the preset command for collecting diagnostic information about voice quality, and collecting information according to the command if determining that the DTMF signals match the preset command.

A test method provided in an embodiment of the present invention includes: presetting a voice test command, and obtaining DTMF signals; and judging whether the DTMF signals match the preset voice test command, and performing a test according to the voice test command if determining that the DTMF signals match the preset voice test command.

A network device provided in an embodiment of the present invention includes: a signal obtaining unit, configured to obtain DTMF signals; a matching unit, configured to judge whether the DTMF signals obtained by the signal obtaining unit match a preset command for collecting diagnostic information about voice quality; and a processing unit, configured to collect information according to the preset command for collecting diagnostic information about voice quality if the matching unit determines that the DTMF signals obtained by the signal obtaining unit match the preset command.

A network device provided in an embodiment of the present invention includes: a signal obtaining unit, configured to obtain DTMF signals; a matching unit, configured to judge whether the DTMF signals obtained by the signal obtaining unit match a preset command for collecting diagnostic information about voice quality; and a processing unit, configured to notify a BSC that the BSC needs to collect information according to the preset command for collecting diagnostic information about voice quality if the matching unit determines that the DTMF signals obtained by the signal obtaining unit match the preset command.

A network device provided in an embodiment of the present invention includes: a signal obtaining unit, configured to obtain DTMF signals; a matching unit, configured to judge whether the DTMF signals obtained by the signal obtaining unit match a preset voice test command; and a processing unit, configured to perform a test according to the preset voice test command if the matching unit determines that the DTMF signals obtained by the signal obtaining unit match the voice test command.

As described above, one of the technical solutions under the present invention is: a mapping relationship between the DTMF signals and the command for collecting diagnostic information about voice quality is preset in an NE; once a voice problem occurs, DTMF signals are generated by performing simple operations; the network can collect diagnostic information according to the command for collecting diagnostic information about voice quality after determining that the DTMF signals match the preset command for collecting diagnostic information about voice quality, and therefore the diagnostic information is collected quickly after a voice quality problem occurs.

Another technical solution under the present invention is: a mapping relationship between the DTMF signals and the voice test command is preset in an NE; once a voice problem occurs, DTMF signals are generated by performing simple operations; the network can perform a test according to the voice test command after determining that the DTMF signals match the preset voice test command, and therefore the test can be performed quickly to find the fault causes after a voice quality problem occurs.

DETAILED DESCRIPTION OF THE EMBODIMENTS

The embodiments of the present invention provide a method for collecting communication information so that diagnostic information is collected quickly after a voice quality problem occurs.

In the technical solution under the present invention, after a voice quality problem occurs, simple operations can trigger the network to automatically record and collect relevant diagnostic information about voice quality. The diagnostic information serves as a reference in solving the voice problem.

Figure 1:
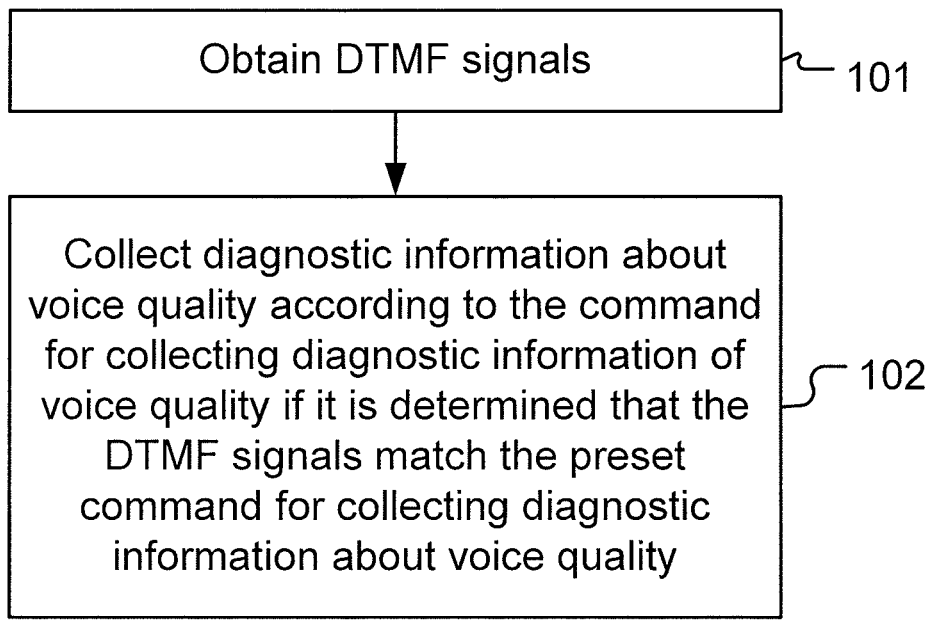
FIG. 1 is a flowchart of a method for collecting communication information in a first embodiment of the present invention.

FIG. 1 is a flowchart of a method for collecting communication information in the first embodiment of the present invention. The method includes the following steps:

101. Obtain DTMF signals.

The network device obtains DTMF signals. The DTMF signals may be signals generated by pressing certain keys on a user terminal or a test device.

102. Collect diagnostic information about voice quality according to a command for collecting diagnostic information about voice quality if it is determined that the DTMF signals match the preset command for collecting diagnostic information about voice quality.

If the network device is an MSC, after the MSC determines that the DTMF signals match the preset command for collecting diagnostic information about voice quality, the MSC collects the diagnostic information about voice quality directly according to the preset command, or the MSC notifies the BSC to collect the diagnostic information about voice quality according to the preset command.

If the network device is a BSC, after the BSC determines that the DTMF signals match the preset command for collecting diagnostic information about voice quality, the BSC collects the diagnostic information about voice quality according to the preset command.

It should be noted that, although the MSC or BSC serves as an example of the network device above, the network device may be other devices on the network.

The following further describes the technical solution under the present invention.

Figure 2:
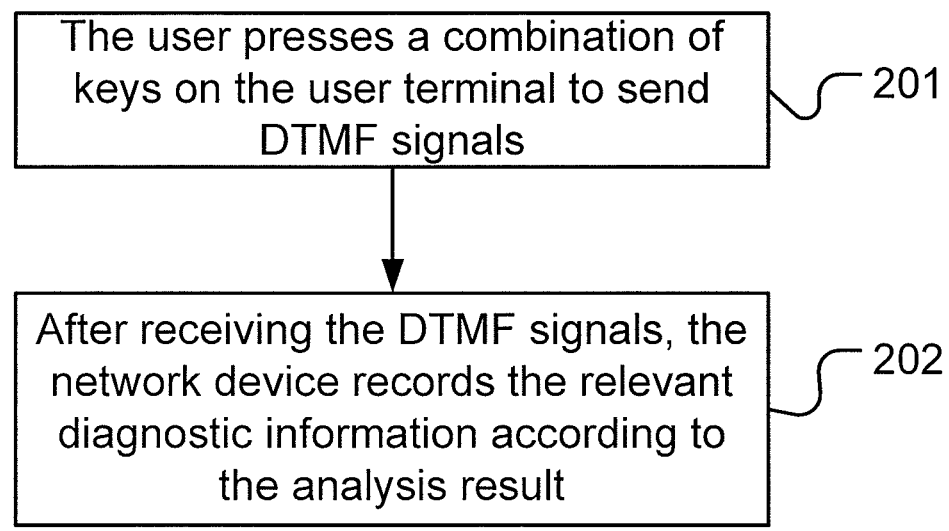
FIG. 2 is a flowchart of a method for collecting communication information in a second embodiment of the present invention.

FIG. 2 is a flowchart of a method for collecting communication information in the second embodiment of the present invention. In this embodiment, DTMF signals are generated on a user terminal to trigger collection of diagnostic information.

FIG. 2 includes the following steps:

201. A user presses a combination of keys on a user terminal to send DTMF signals.

A voice problem occurs in the dialing process. In this case, the user can press the keys such as "*#" on the user terminal directly to send DTMF signals.

It should be noted that the signals corresponding to the key combination on the user terminal are in a mapping relationship with the preset command for collecting diagnostic information about voice quality on the network.

202. After receiving the DTMF signals, the network device records the relevant diagnostic information according to an analysis result.

It is assumed that the network device is an MSC.

After receiving the DTMF signals, the MSC judges whether the DTMF signals match a preset command for collecting diagnostic information about voice quality. If determining that the DTMF signals match a preset command for collecting diagnostic information about voice quality, the MSC knows that a voice problem occurs in this call, and therefore records and collects the relevant diagnostic information according to the command for collecting diagnostic information about voice quality.

The collected diagnostic information includes but is not limited to: circuit used in the call, call type, supplementary service in use, information about the calling party and the called party, timeslot switching topology of the trunk circuit, voice recorded in the incoming and outgoing directions of each endpoint (circuit), and special flag recorded in the bill generated for this call (this flag is a basis of charge reduction or exemption).

Alternatively, after determining that the DTMF signals match the preset command for collecting diagnostic information about voice quality, the MSC may notify the BSC to record and collect the relevant information according to the command for collecting diagnostic information about voice quality (in this case, the BSC is generally not capable of resolving DTMF signals). If the bearer is separated from control (which means softswitch architecture) in the MSC, the MSC includes two physical entities: Media Gateway (MGW) and MSC server. The MSC server may add a new information element to an audit message or a new message for notifying the MGW to record the relevant diagnostic information about voice quality.

If the MSC notifies the BSC to record the diagnostic information by sending a message, the Trace Type in the MSC Invoke Trace message needs to be extended, and an identification value needs to be set. For example, an enumerated value is added to indicate collection of diagnostic information about voice quality. If the Trace Type has an existing value range, a new value may be added to indicate collection of diagnostic information about voice quality. The BSC collects information according to this indication. The MSC sends the MSC Invoke Trace message to the BSC, notifying the BSC to start tracing.

Table 1 shows an extension of the MSC Invoke Trace message in this embodiment:

TABLE 1

| Information Element | Reference | Direction | Type | Length |
|---|---|---|---|---|
| Message Type | 3.2.2.1 | MSC-BSS | M (mandatory) | 1 |
| Trace Type | 3.2.2.37 | MSC-BSS | M | 2 |
| Triggerid | 3.2.2.38 | MSC-BSS | O (optional) | 3-22 |
| Trace Reference | 3.2.2.39 | MSC-BSS | M | 3 |
| Transactionid | 3.2.2.40 | MSC-BSS | O | 4 |
| Mobile Identity | 3.2.2.41 | MSC-BSS | O | 3-10 |
| OMCId | 3.2.2.42 | MSC-BSS | O | 3-22 |

The network device may be a BSC. In this case, the BSC is capable of resolving DTMF signals. The following description assumes that the network device is a BSC.

After receiving the DTMF signals, the BSC judges whether the DTMF signals match a preset command for collecting diagnostic information about voice quality. If determining that the DTMF signals match a preset command for collecting diagnostic information about voice quality, the BSC knows that a voice problem occurs in this call, and therefore records and collects the relevant diagnostic information according to the command for collecting diagnostic information about voice quality.

The collected diagnostic information includes but is not limited to: circuit used in the call, timeslot switching topology of the trunk circuit, and voice recorded in the incoming and outgoing directions of each trunk circuit of the BSC.

It should be noted that the network device (MSC or BSC) may forward the collected diagnostic information (such as call information and recorded voice) to a dedicated Server through an Operation and Maintenance System (OMS), and the Server uses relevant software to analyze the diagnostic information. The operation and maintenance department of the telecom operator may filter an analysis result.

It should be noted that to prevent malicious operations on the user terminal, a threshold may be set to limit the number of times of pressing the combination of keys, or a threshold is set according to the user type. That is, the number of times of pressing the keys needs to be less than or equal to the threshold.

It is evident that in this embodiment, after a voice problem occurs, a combination of keys may be pressed on the user terminal to generate the corresponding DTMF signals, which trigger the network device to record the relevant diagnostic information about voice quality quickly.

Figure 3:
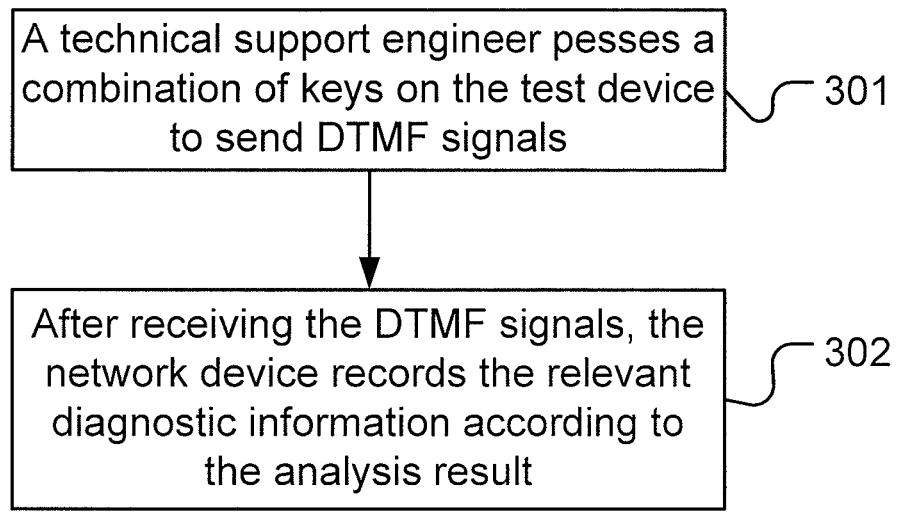
FIG. 3 is a flowchart of a method for collecting communication information in a third embodiment of the present invention.

FIG. 3 is a flowchart of a method for collecting communication information in the third embodiment of the present invention. In this embodiment, DTMF signals are generated on a test device to trigger collection of diagnostic information.

FIG. 3 includes the following steps:

301. A technical support engineer presses a combination of keys on the test device to send DTMF signals.

After a voice problem is detected, the technical support engineer presses the keys on the test device directly to send DTMF signals.

It should be noted that a mapping relationship between the signals corresponding to the combination of keys on the test device and the preset command for collecting diagnostic information about voice quality on the network is preset. Because the technical support engineer is different from a terminal user, the processing varies with a scenario related to the technical support engineer and a scenario related to a terminal user. In the second embodiment, the operation designed for the terminal user needs to be simple and clear, and the set mapping relationship is simple. In the third embodiment, the technical support engineer can perform more detailed and more sophisticated operations, and more functions can be provided, and more mapping relationships are set to obtain complete and more detailed information.

It should be noted that the test device may be the user terminal mentioned above, or a device for the test purpose.

This step is detailed as follows:

Commands for collecting diagnostic information about voice quality are defined, and the commands are mapped to outband DTMF signals. To prevent conflict with the method of using the outband DTMF signals already applied in the GSM protocol, the mapping relationship between the commands for collecting diagnostic information about voice quality and the outband DTMF signals is preset in the MSC (MSC is taken as an example here). For example, the mapping relationship is defined as follows:

The keys "**0" correspond to "collect call-related information on the MSC, and output the information to the OMC".

302. After receiving the DTMF signals, the network device records the relevant diagnostic information according to an analysis result.

It is assumed that the network device is an MSC.

After collecting the DTMF signals transmitted by the test device through outband signaling, the MSC judges whether the DTMF signals match a preset command for collecting diagnostic information about voice quality. If determining that the DTMF signals match a preset command for collecting diagnostic information about voice quality, the MSC knows that a voice problem occurs in this call, and therefore records and collects the relevant diagnostic information about voice quality according to the command for collecting diagnostic information about voice quality, and performs the corresponding maintenance according to the diagnostic information.

Alternatively, after determining that the DTMF signals match a preset command for collecting diagnostic information about voice quality, the MSC may notify the BSC to record and collect the relevant information according to the command for collecting diagnostic information about voice quality (in this case, the BSC is generally not capable of resolving DTMF signals). If the bearer is separated from control (which means softswitch architecture) in the MSC, the MSC includes two physical entities: MGW and MSC server. The MSC server may add a new information element to an audit message or a new message for notifying the MGW to record the relevant diagnostic information.

If the MSC notifies the BSC to record the diagnostic information by sending a message, the Trace Type in the MSC Invoke Trace message needs to be extended, and an identification value needs to be set. For example, an enumerated value is added to indicate collection of diagnostic information about voice quality. If the Trace Type has an existing value range, a new value may be added to indicate collection of diagnostic information about voice quality. The BSC collects information according to this indication, which has been detailed above.

The diagnostic information collected by the MSC includes but is not limited to: circuit used in the call, call type, supplementary service in use, information about the calling party and the called party, timeslot switching topology of the trunk circuit used by the call, voice recorded in the incoming and outgoing directions of each endpoint (circuit), and special flag recorded in the bill generated for the call with the voice problem (this flag is a basis of charge reduction or exemption).

The MSC performs the corresponding operation according to the matched command for collecting diagnostic information about voice quality:

For example, if the DTMF signals received by the MSC match the function of "collecting call-related information on the MSC, and outputting the information to the OMC" in the command for collecting diagnostic information about voice quality, the MSC collects the information about the calling party and the called party of the call, circuit used by the call, and timeslot switching topology of the trunk circuit used by the calling party and the called party, and outputs such information to the OMC. Such information is used for analyzing the fault causes subsequently.

It should be noted that, although the MSC is taken as an example above, a BSC may obtain the DTMF signals instead. In this case, the BSC is capable of resolving DTMF signals.

The mapping relationship between the preset command for collecting diagnostic information about voice quality and the outband DTMF signals in the BSC may be similar to the mapping relationship set in the MSC above.

After receiving the DTMF signals, the BSC judges whether the DTMF signals match a preset command for collecting diagnostic information about voice quality. If determining that the DTMF signals match a preset command for collecting diagnostic information about voice quality, the BSC knows that a voice problem occurs in this call, and therefore records and collects the relevant diagnostic information according to the command for collecting diagnostic information about voice quality. The collected diagnostic information includes but is not limited to: circuit used in the call, timeslot switching topology of the trunk circuit, and voice recorded in the incoming and outgoing directions of each trunk circuit of the BSC.

In the two preceding embodiments, the MSC or BSC is taken as an example of the network device. However, other device on the network may work instead to perform the preceding process based on the same principles.

It is evident that in this embodiment, after a voice problem occurs, a combination of keys may be pressed on the test device to generate the corresponding DTMF signals, which trigger the network device to record the relevant diagnostic information about voice quality quickly. After the telecom operator and the telecom manufacturer employ this technical solution, once a voice quality problem occurs in the communication network occasionally, the call-related information and the timeslot switching control information generated in the faulty communication process and stored on the MSC can be collected quickly, and the subsequent processing can be guided by such information.

The embodiments of the present invention provide a method for performing a test according to the matched test command.

For example, for loopback tests, the following mapping relationships are predefined:

The "**1" keys correspond to "start outloop test for the trunk circuit used between the test user and the MSC";

The "**2" keys correspond to "stop outloop test for the trunk circuit used between the test user and the MSC";

The "3" keys correspond to "start inloop test for the trunk circuit used between the test called party and the MSC"; and The "4" keys correspond to "stop inloop test for the trunk circuit used between the test called party and the MSC".

After a voice problem is detected, the technical support engineer presses the keys on the test device directly to send DTMF signals. The MSC collects the DTMF signals transmitted by the test device through outband signaling, judges whether the DTMF signals match a preset voice test command, and performs operations according to the matching result. For example, for the DTMF signals sent as a result of dialing "**3", the MSC determines that the DTMF signals match "start inloop test for the trunk circuit used between the test called party and the MSC", and performs this test.

The trunk circuit loop test performed on the MSC may be based on existing systems. By isolating the trunk circuit used in the call made on the test device from the MSC, the trunk circuit outloop test is designed to detect whether the voice quality problem is brought by the MSC. By isolating the trunk circuit used in the call made on the test device from the switching control part of the access network of the called device, the trunk circuit inloop test is designed to detect whether the voice quality problem is brought by the access network of the called device.

After the trunk loop test is performed, the earpiece of the test device should be able to receive the voice input by the local microphone. If the earpiece of the test device is unable to receive the voice input by the local microphone, it is sure that the trunk loop is faulty. By performing "trunk circuit outloop test" and "trunk circuit inloop test", the faulty section of the call path can be determined.

Although the MSC is taken as an example of the network device above, another device on the network may work instead to perform the foregoing process based on the same principles.

It is evident that, by using the preceding test method, the fault analysis scope is narrowed and the faulty section of the call path is determined in the shortest time by means of a circuit loop test. The preceding technical solution enhances the maintainability of the equipment of the telecom manufacturer, indirectly improves the Quality of Service (QoS) of the mobile communication system, enhances the satisfaction of end users, and improves the QoS of the operator.

Corresponding to the preceding method for collecting communication information a network device is provided in an embodiment of the present invention.

Figure 4:
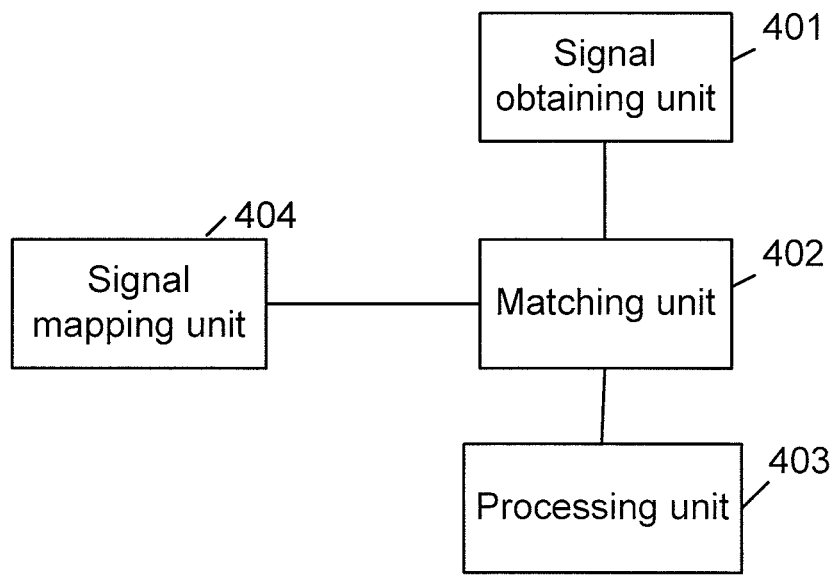
FIG. 4 shows a structure of a first network device in an embodiment of the present invention.

FIG. 4 shows a structure of a first network device in an embodiment of the present invention.

As shown in FIG. 4, the network device includes:

a signal obtaining unit 401, configured to obtain DTMF signals;

a matching unit 402, configured to judge whether the DTMF signals obtained by the signal obtaining unit 401 match a preset command for collecting diagnostic information about voice quality; and a processing unit 403, configured to collect information according to the preset command for collecting diagnostic information about voice quality if the matching unit 402 determines that the DTMF signals obtained by the signal obtaining unit 401 match a preset command.

The network device further includes:

a signal mapping unit 404, configured to set a mapping relationship between DTMF signals and a command for collecting diagnostic information about voice quality, where the DTMF signals correspond to a combination of keys of the user terminal or a test device.

The network device is an MSC or a BSC.

Figure 5:
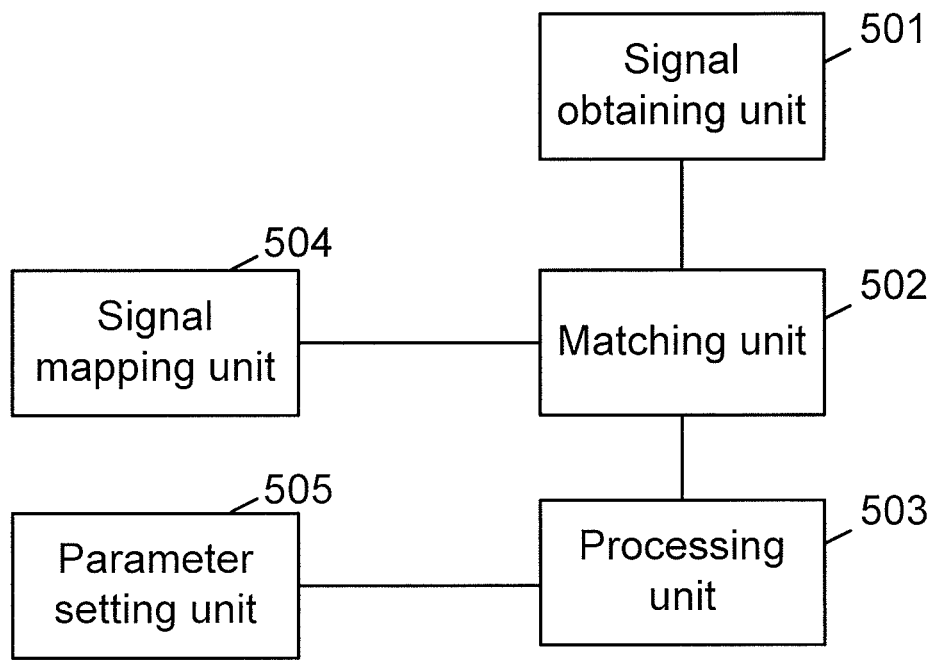
FIG. 5 shows a structure of a second network device in an embodiment of the present invention.

FIG. 5 shows a structure of a second network device in an embodiment of the present invention.

As shown in FIG. 5, the network device includes:

a signal obtaining unit 501, configured to obtain DTMF signals;

a matching unit 502, configured to judge whether the DTMF signals obtained by the signal obtaining unit 501 match a preset command for collecting diagnostic information about voice quality; and a processing unit 503, configured to notify a BSC that the BSC needs to collect information according to the preset command for collecting diagnostic information about voice quality if the matching unit 502 determines that the DTMF signals obtained by the signal obtaining unit 501 match a preset command.

The network device further includes:

a signal mapping unit 504, configured to set a mapping relationship between DTMF signals and a command for collecting diagnostic information about voice quality, where the DTMF signals correspond to a combination of keys of the user terminal or test device.

The network device further includes:

a parameter setting unit 505, configured to set a Trace Type parameter in an Invoke Trace message, where an identification value of the parameter is used to instruct the BSC to collect information.

In this case, the processing unit 503 sends an Invoke Trace message to the BSC, thus notifying the BSC that the BSC needs to collect information according to a command for collecting diagnostic information about voice quality.

The network device is an MSC.

Figure 6:
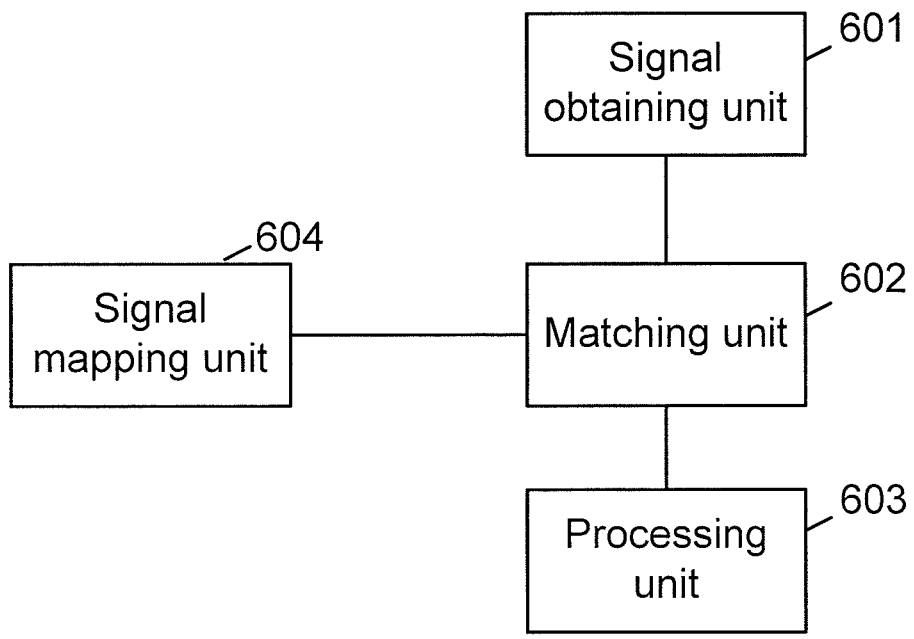
FIG. 6 shows a structure of a third network device in an embodiment of the present invention.

FIG. 6 shows a structure of a third network device in an embodiment of the present invention.

As shown in FIG. 6, the network device includes:

a signal obtaining unit 601, configured to obtain DTMF signals;

a matching unit 602, configured to judge whether the DTMF signals obtained by the signal obtaining unit 601 match a preset voice test command; and a processing unit 603, configured to perform a test according to the preset voice test command if the matching unit 602 determines that the DTMF signals obtained by the signal obtaining unit 601 match a voice test command.

The network device further includes:

a signal mapping unit 604, configured to set a mapping relationship between DTMF signals and a voice test command, where the DTMF signals correspond to a combination of keys of the test device.

As described above, one of the technical solutions under the present invention is: a mapping relationship between the DTMF signals and the command for collecting diagnostic information about voice quality is preset; once a voice problem occurs, DTMF signals are generated by performing simple operations; the network can collect diagnostic information according to the command for collecting diagnostic information about voice quality after determining that the DTMF signals match the preset command for collecting diagnostic information about voice quality, and therefore the diagnostic information is collected quickly after a voice quality problem occurs.

Further, the DTMF signals in the technical solution under the present invention may be signals corresponding to a combination of keys of the user terminal or test device. That is, this technical solution is applicable to both common users and technical support engineers, and is flexible to use.

Further, the technical solution under the present invention may be performed by a BSC or an MSC on the network.

Another technical solution under the present invention is: a mapping relationship between the DTMF signals and the voice test command is preset in an NE; once a voice problem occurs, DTMF signals are generated by performing simple operations; the network can perform a test according to the voice test command after determining that the DTMF signals match the preset voice test command, and therefore the test can be performed quickly to find the fault causes after a voice quality problem occurs.

Detailed above are a method for collecting communication information, a test method, and a network device under the present invention. Although the invention is described through some exemplary embodiments, the invention is not limited to such embodiments. It is apparent that those skilled in the art can make modifications and variations to the invention without departing from the scope of the invention. The invention is intended to cover the modifications and variations provided that they fall within the scope of protection defined by the following claims or their equivalents.

The invention claimed is:

1. In a Mobile Switching Center (MSC), a method for collecting communication information, comprising:
    receiving one or more Dual Tone Multi Frequency (DTMF) signals from a Base Station Controller (BSC) handling a call for a user terminal device;
    determining that the one or more DTMF signals match a preset command for collecting diagnostic information about voice quality of the call; and
    based on the preset command, notifying the BSC to collect the diagnostic information about the voice quality of the call;
    wherein the notifying the BSC to collect the diagnostic information according to the preset command further comprises:
    sending an Invoke Trace message to the BSC, wherein the Invoke Trace message contains a Trace Type parameter, and an identification value of the Trace Type parameter is used to instruct the BSC to collect the diagnostic information.

2. The method for collecting the communication information according to claim 1, wherein:
    the received one or more DTMF signals are generated after a combination of keys is pressed on a user terminal or a test device, and the signals corresponding to the combination of the keys are mapped to the command for collecting the diagnostic information about the voice quality of the call.

3. The method for collecting the communication information according to claim 1, wherein the step of initiating the collecting of the diagnostic information about the voice quality of the call further comprises:
    collecting the diagnostic information about the voice quality of the call.

4. The method for collecting communication information according to claim 2, wherein:
    a threshold is set to limit the number of times of pressing the combination of keys, and the obtained DTMF signals are generated only if the number of times of pressing the combination of keys is less than or equal to the threshold.

5. A network device, comprising:
    a signal obtaining unit, configured to obtain Dual Tone Multi Frequency (DTMF) signals;
    a matching unit, configured to determine when the DTMF signals obtained by the signal obtaining unit match a preset command for collecting diagnostic information about voice quality;
    a notification unit, configured to notify a Base Station Controller (BSC) of the need to collect information according to the preset command for collecting the diagnostic information about the voice quality, based on determination that the DTMF signals obtained by the signal obtaining unit match the preset command, and send an Invoke Trace message to the BSC, thus notifying the BSC that the BSC needs to collect the information according to the preset command for collecting the diagnostic information about the voice quality; and
    a parameter setting unit, configured to set a Trace Type parameter in the Invoke Trace message, wherein an identification value of the Trace Type parameter is used to instruct the BSC to collect the information.

6. The network device according to claim 5, further comprising:
    a signal mapping unit, configured to set a mapping relationship between the DTMF signals and the command for collecting diagnostic information about voice quality, wherein the DTMF signals correspond to a combination of keys of a user terminal or a test device.

7. The network device according to claim 5, wherein:
    the network device is a Mobile Switching Center (MSC).

8. A computer program product comprising computer executable instructions stored on a non-transitory recordable medium such that when executed by a processor cause a Mobile Switching Center (MSC) to perform the following:

receiving one or more Dual Tone Multi Frequency (DTMF) signals from a Base Station Controller (BSC) handling a call for a user terminal device;

determining that the one or more DTMF signals match a preset command for collecting diagnostic information about voice quality of the call; and based on the preset command, notifying the BSC to collect the diagnostic information about the voice quality of the call;

wherein the instructions that notifying the BSC to collect the diagnostic information according to the preset command further comprises:

sending an Invoke Trace message to the BSC, wherein the Invoke Trace message contains a Trace Type parameter and an identification value of the parameter is used to instruct the BSC to collect the diagnostic information.

9. The computer program product according to claim 8, wherein:

the received one or more DTMF signals are generated after a combination of keys is pressed on a user terminal or a test device, and the signals corresponding to the combination of the keys are mapped to the command for collecting the diagnostic information about the voice quality of the call.

* * * * *